United States Patent Office 3,644,628
Patented Feb. 22, 1972

---

3,644,628
COMPOSITIONS HAVING TESTOSTERONE ANTAGONISTIC EFFECTS AND METHOD OF USING THE SAME
George Tonelli, 15 Seneca Ave., Emerson, N.J. 07630
No Drawing. Continuation-in-part of application Ser. No. 736,982, June 14, 1968, which is a continuation-in-part of application Ser. No. 628,295, Apr. 4, 1967. This application Aug. 29, 1969, Ser. No. 854,284
Int. Cl. A61v 27/00
U.S. Cl. 424—270
6 Claims

ABSTRACT OF THE DISCLOSURE

A new use for known compounds of the category 2-lower alkanoylamino-5-nitrothiazoles is described. These compounds, when administered to mammals, counteract the biological effect of testosterone on end organs.

---

This application is a continuation-in-part of my application Ser. No. 736,982, filed June 14, 1968, which in turn is a continuation-in-part of my application Ser. No. 628,295, filed Apr. 4, 1967, both are now abandoned.

BRIEF SUMMARY OF THE INVENTION

This invention relates to a method of administering pharmaceutical compositions. More particularly, to administering novel pharmaceutical compositions containing lower alkanoyl aminonitrothoiazoles which are effective in decreasing the biological effect of testosterone on end organs (anti-testosterone effect). The said compositions are of potential use in the therapy of endocrinopathies related to excess endogenous production or end organ hyper-responsiveness to testosterone.

The present invention comprises a pharmaceutical composition containing as the essential active component, a compound of the formula:

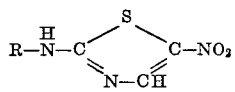

wherein R is lower alkanoyl. Among the compounds included in the scope of the invention are, for example, 2-acetylamino-5-nitrothiazole, 2-propionylamino - 5 - nitrothiazole or 2-butyrylamino-5-nitrothiazole.

The 2-lower alkanoylamino 5-nitrothiazoles of the present invention are, in general, greenish-yellow to orange-yellow to yellow colored crystalline solids, relatively insoluble in water.

The compounds are well known in the literature but up until the time of this invention, their use for antitestosterone effect has not been described. Methods for the preparation of these compounds are found in the literature, such as U.S. Pat. 2,531,756 or 2,631,963. The active components of the compositions of matter of the present invention, the 2-loweralkanoylamino-5-nitrothiazoles, have been found to be highly effective in restricting the biological effect of testosterone in mammals, for example, rats and mice. The doses at which these effects occurred, ranged from about 1 to 64 mg./kg./day, which are substantially lower than effective antitrichomoniasis doses. In this connection, as noted in the recent review "Advances in Chemotherapy," vol. 3, 1968, Academic Press, New York and London, Eds. A. Goldin, F. Hawking and R. J. Schnitzer, the curative dose in the rat for Trichomonas vaginalis was greater than 300 mg./kg./day by the oral route. Curative doses of between 300–400 mg./kg. against this same organism are described in Experimental Chemotherapy vol. 1, 1963. Eds. Schnitzer, R. J., and Hawking, F., Academic Press, New York.

The compounds do not present any lasting or serious side effects and have satisfactory ranges between therapeutically effective and toxic doses in mammals.

The findings (see Examples 1, 2, 3 and 4) that these compounds are capable of reducing the hypertrophy of certain end organs resultant from administration of testosterone is of practical importance in the treatment of syndromes caused by excess testosterone production.

The compositions of the present invention containing the active component and a non-toxic carrier may be administered orally or parenterally as well as topically. For oral or parenteral administration the compositions are preferably presented for administration in unit dosage forms, such as, for example, tablets, capsules, granules, powders, oral solutions or suspensions, or sterile parenteral solutions or suspensions, and the like. The amount of active component administered per day may vary from 1 to 64 mg./kg. of mammal.

For preparing solid compositions such as tablets, the active component is mixed with conventional tableting ingredients such as corn starch, lactose, sucrose, sorbitol, talc, stearic acid, magnesium stearate, dicalcium phosphate, gums and functionally similar materials as pharmaceutical diluents or carriers. The tablets of the novel compositions can be laminated or otherwise compounded to provide a dosage form affording the advantage of prolonged or delayed action or predetermined successive action of the enclosed medication. For example, the tablet can comprise an inner dosage and an outer component, the latter being in the form of an envelope over the former. The two components can be separated by an enteric layer which serves to resist distintegration in the stomach and permits the inner component to pass intact into the duodenum or to be delayed in release. A variety of materials can be used for such enteric layers or coatings, such as materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel compositions of the present invention may be incorporated for administration include aqueous solutions, suitably flavored syrups, aqueous or oil suspensions, flavored emulsions with edible oils such as cottonseed oil, sesame oil, coconut oil, peanut oil, and the like, as well as elixirs and similar pharmaceutical vehicles. Suitable dispersing or suspending agents for aqueous suspensions include synthetic and natural gums such as tragacanth, acacia, alginate, dextran, sodium carboxymethylcellulose, methylcellulose, polyvinylpyrrolidone, gelatin, and the like. Sterile suspensions or solutions are required for parenteral use. Isotonic preparations containing suitable preservatives are also highly desirable for injection use.

The term unit dosage form as used in the specification and claims refers to physically discrete units suitable as unitary dosages for mammals each unit containing a predetermined quantity of active material calculated to produce the desired therapeutic effect in association with the required pharmaceutical diluent, carrier or vehicle. A convenient dosage unit form may contain 25 to 250 milligrams of the active therapeutic ingredient.

DETAILED DESCRIPTION

The following examples describing specific testing procedures show evidence of the anti-testosterone properties of particularly 2-acetylamino-5-nitrothiazole, as demonstrated by recognized laboratory bioasays. Where effects were statistically evaluated for significance, Dunnett's procedure was used. (C. W. Dunnett, "A Multiple Comparison Procedure for Comparing Several Treatments With a Control," Journ. Am. Stat. Assoc., 50, 1096, 1955.) In the examples illustrating various formulations, a 2-lower alkanoylamino-5-nitrothiazole such as 2-acetylamino-5-nitrothiazole may be used as the active ingredient. In the examples amounts are by weight unless otherwise indicated.

EXAMPLE 1

Utilization of the castrated rat or mouse for assessing the potential anti-testosterone (=anti-androgen) effect of compounds is a recommended and accepted laboratory procedure, as noted in Methods in Hormone Research, vol. II, 1960, Academic Press, New York and London, Ed. R. I. Dorfman, and in Experimental Endocrinology, 1964, Academic Press, New York and London, authors M. X. Zarrow, J. M. Yochim and J. L. McCarthy.

In this test, testosterone and the compound under examination are injected subcutaneously each at a separate site, once a day for 7 consecutive days, beginning on the fourth day following castration. Castration of the male removes the testes which are normally the major site of production and source of testosterone in the animal. The weights of seminal vesicles and ventral prostate, which depend on testosterone for their growth and integrity, are determined 24 hours after the last dosing. The compound is considered anti-testosterone if it interferes with this testosterone effect by reducing weight gain. Table I summarizes the typical effects of 2-acetylamino-5-nitrothiazole administered subcutaneously at doses ranging from 2 to 30 mg./kg. per rat. The compound exhibits significant anti-testosterone activity.

TABLE I

Anti-testosterone activity of test compound as assessed in the castrated rat receiving 50 or 100 mcg. of testosterone

| Treatment | Dose of anti-androgen, mcg./rat/day | Rat weight (g.) Initial | Rat weight (g.) Final | Relative organ wts. (mg./100 g.) Vent. Prost. | Percent testosterone response | Sem. Vesc. | Percent testosterone response |
|---|---|---|---|---|---|---|---|
| CMC vehicle | | 63±7 | 92±10 | 10.2±4 | | 11.0±2 | |
| Testosterone (50 mcg.) | | 63±7 | 100±10 | 43.8±11 | 100 | 56.9±16 | 100 |
| Testosterone (50 mcg.) plus 2-acetylamino-5-nitrothiazole | 100 | 63±6 | 97±8 | 31.8±7 | [1] 73 | 33.9±10 | [3] 60 |
| | 500 | 63±5 | 93±9 | 21.8±7 | [3] 50 | 21.5±3 | [3] 38 |
| | 2,500 | 63±5 | 94±7 | 23.3±9 | [3] 53 | 22.9±5 | [3] 40 |
| CMC vehicle | | 65±4 | 99±8 | 9.4±2 | | 10.3±2 | |
| Testosterone (100 mcg.) | | 66±4 | 102±9 | 67.4±13 | 100 | 90.9±23 | 100 |
| Testosterone (100 mcg.) plus 2-acetylamino-5-nitrothiazole | 100 | 67±4 | 105±7 | 49.9±8 | [3] 74 | 58.8±9 | [3] 65 |
| | 500 | 67±4 | 105±6 | 52.5±10 | [1] 78 | 59.1±10 | [3] 65 |
| | 2,500 | 67±4 | 98±9 | 43.8±5 | [3] 65 | 44.2±13 | [3] 49 |

[1] = $P \leq 0.1$, [2] = $P \leq 0.05$, [3] = $P \leq 0.01$.

NOTE.—Vent. Prost.=ventral prostate. Sem. Vesc.=seminal vesicles. Testosterone and test compounds administered subcutaneously 4 days after castration once a day, for 7 consecutive days. Values given are means ± standard deviation. Eight rats used as controls and with each dosage level.

EXAMPLE 2

Table II shows that 2-acetylamino-5-nitrothiazole reduces the effects of testosterone in the castrated mouse as well. The use of the castrated mouse is likewise noted in the literature reference given under Example 1. In this bioassay, the subject compound is administered orally once a day for 7 consecutive days. Testosterone is administered concomitantly at daily doses of 100 mcg. by subcutaneous route. The compound exhibits significant anti-testosterone action.

TABLE II

Effects of 2-acetylamino-5-nitrothiazole administered subcutaneously with and without testosterone, to the hemicastrated rat for ten consecutive days

| Treatment | Dose, mg./rat/day | No. of rats | Rat wt. (g.) Initial | Rat wt. (g.) Final | Relative organ weights (mg./100 g.) Testis | Vent. Prost. | Sem. Vesc. |
|---|---|---|---|---|---|---|---|
| CMC (intact) | | 8 | 57.1 | 102.2 | 473.5±57 | 46.7±7 | 20.8±7 |
| CMC | | 8 | 55.3 | 101.2 | 530.9±50 | 45.9±13 | 18.7±6 |
| 2-acetylamino-5-nitrothiazole | 2.5 | 8 | 55.6 | 91.1 | 543.0±85 | 43.0±7 | 13.7±4 |
| | 5.0 | 8 | 57.5 | 98.3 | 551.0±82 | 43.9±7 | 15.5±4 |
| | 10.0 | 8 | 65.6 | 106.0 | 508.4±43 | 39.2±7 | 14.5±6 |
| Testosterone (100 mcg.) | | 8 | 59.6 | 106.0 | 288.6±49 | 101.7±23 | 118.0±29 |
| Testosterone (100 mcg.) plus 2-acetylamino-5-nitrothiazole | 2.5 | 6 | 59.2 | 96.1 | 514.2±66 | [2] 57.5±14 | [2] 28.8±4 |
| | 5.0 | 6 | 59.0 | 87.6 | 455.4±69 | [2] 71.8±10 | [2] 28.6±8 |
| | 10.0 | 6 | 57.8 | 84.0 | 386.1±88 | [2] 55.3±14 | [2] 31.2±7 |

[1] = $P \leq 0.05$, [2] = $\leq 0.01$.

NOTE.—Vent. Prost.=ventral prostate. Sem. Vesc.=seminal vesicles. Values given are means ± standard deviation.

EXAMPLE 3

Another method of determining the anti-testosterone activity of test compounds is with the use of the hemicastrated rat. This method, in addition, establishes whether the compound has antigonadotropic activity. Antigonadotropic activity is defined as inhibition of the release of the tropic hormones of the pituitary gland which controls testicular growth and whose action is independent, as we show, of the anti-testosterone effect of these claims. Four days after hemicastration (removal of right testicle), which results in greater gonadotropin release from the pituitary, rats receive testosterone and the test compound (at a separate site) once a day for 10 consecutive days. On the eleventh day, the remaining testicle, seminal vesicles and ventral prostate are removed and weighed. Testosterone alone causes an increase in the weights of the seminal vesicles and ventral prostate (androgenic effect), and a decrease in the weight of the remaining testicle (antigonadotropic effect). The results are shown in Table III. 2-acetylamino-5-nitrothiazole administered alone, did not reduce pituitary gonadotropin activity since testicular weight did not change; when administered together with testosterone, testicular weight was not further reduced as would be expected where the compounds are antigonadotropic.

Example 3 also shows 2-acetylamino-5-nitrothiazole inhibiting the weight increases of the ventral prostate and seminal vesicles which normally result from testosterone administration, again confirming the anti-testosterone activity of the compound.

TABLE III

Anti-testosterone activity of test compound as assessed in the castrated mouse receiving 100 mcg. of testosterone

| Treatment | Dose of anti-androgen, mcg./mouse/day | Final body weight (g.) | Relative organ wts. (mg./100 g.) | |
|---|---|---|---|---|
| | | | Sem. Vesc. | Vent. Prost. |
| CMC vehicle | | 22.9 | 43±16 | (¹) |
| Testosterone (100 mcg.) plus 2-acetylamino-5-nitrothiazole | 333 | 21.9 | ³ 158.1±22 | 15.3±6 |
| | 1,000 | 20.9 | ³ 159.0±27 | ³ 7.4±3 |
| | 3,000 | 21.4 | ³ 151.1±32 | ³ 11.9±5 |

¹ Too small to weigh.   ² =P≤0.05.   ³ =P<0.01.

NOTE.—Vent. Prost=Ventral prostate. Sem. Vesc.=Seminal vesicles. Values are means ± standard deviation based on 7 animals per treatment.

EXAMPLE 4

A second method of determining if a compound has anti-gonadotropic as well as anti-testosterone effects is by the use of the parabiotic rat, as noted in standard textbooks of Endocrinology (references are given under Example 1). In the parabiosis study, 21-day old male Wyckoff rats, weighing an average of 45 g., are castrated and, 3 days later, surgically united to 23 day old intact female rats of an average weight to 50 g. (When united in this way the normal feed back effect on the pituitary of both the male and the female partners of endogenous testosterone produced by the testes is prevented and pituitary gonadotropins are released in a greater than normal amount, stimulating the growth of sensitively responsive tissues such as the ovaries.) The subject compound, either alone or with testosterone, is injected subcultaneously in the castrated male, once a day for 10 consecutive days. On the eleventh day the ovaries of the female partner and the ventral prostate and seminal vesicles of the male partner are removed and weighed. The data are presented in Table IV. Administration of 100 mcg./rat/day of testosterone reduced ovarian hypertrophy from 191±57 mg. to 64±29 mg., a reflection of the androgen's known anti-gonadotropic activity. Ovarian weights following administration of 2 or 5 mg. of 2-acetylamino-5-nitrothiazole are not markedly changed. That 2-acetylamino-5-nitrothiazole does not possess anti-gonadotropic activity is substantiated by the results obtained following administration of the compound with testosterone. Under the latter conditions, 2-acetylamino-5-nitrothiazole significantly interferes with the ovarian weight depressing effects of testosterone. If the compound were "anti-gonadotropic" a further reduction in ovarian weight would have occurred. The data also show that 2-acetylamino-5-nitrothiazole reduces the effectiveness of testosterone on seminal vesicles and ventral prostate again confirming the anti-testosterone activities of the compound.

TABLE IV antigonadotropic and antiandrogenic activities of 2-acetylamino-5-nitrothiazole in the parabiotic rat

| Compounds administered (mg./rat/day) | | | Organ weighs: mg./100 g. B.W. (Mean ± S.D.) | | |
|---|---|---|---|---|---|
| Testosterone | 2-acetyl-amino-5-nitrothiazole | No. of pairs | Intact female ovaries | Castrated male | |
| | | | | Seminal vesicles | Ventral prostate |
| 0 | 0 | ¹ 5 | 30±6 | | |
| 0 | 0 | 5 | 190±69 | 10.8±2 | 12.3±2 |
| 0 | 2 | 5 | 159±73 | 10.8±2 | 11.4±4 |
| 0 | 0 | ¹ 13 | 32±5 | | |
| 0 | 0 | 13 | 191±57 | 12.9±3 | 10.6±5 |
| 0 | 5 | 12 | 175±49 | 12.4±2 | 9.7±2 |
| 0.1 | 0 | 6 | 64±29 | 58.0±10 | 54.0±13 |
| 0.1 | 2 | 4 | ² 124±57 | ³ 43.0±14 | ² 35.0±7 |
| 0.1 | 5 | 5 | ³ 113±22 | ⁴ 38.0±5 | ² 32.0±12 |

¹ Non-parabiont female.   ² =P<0.025.   ³ =P<0.05.   ⁴= P <0.005.

EXAMPLE 5

Preparation of tablets containing 2-acetylamino-5-nitrothiazole

The anti-testosterone compound, 2-acetylamino-5-nitrothiazole is incorporated into a standard pharmaceutical tablet according to the following formulation.

| Ingredient | Per tablet, mg. | For 10,000 tablets, g. |
|---|---|---|
| 2-acetylamino-5-nitrothiazole | 50 | 500 |
| Lactose | 225 | 2,250 |
| Corn starch (for mix) | 50 | 500 |
| Corn starch (for paste) | 25 | 250 |
| Magnesium stearate | 50 | 500 |
| Total | 400 | 4,000 |

The active ingredient, 2-acetylamino-5-nitrothiazole, lactose and corn starch for mix are blended together. The corn starch for paste is suspended in water at a ratio of 100 g. of corn starch per 800 ml. of water and heated with stirring to form a paste. The resulting paste is then used to granulate the blended powder. Additional water is used if necessary. The wet granules are passed through a No. 8 screen and dried at 120° F. The dry granules are passed through a No. 16 screen and lubricated with the magnesium stearate. The granulation is then compressed into tablets (tablet wt. 355 mg.) in a suitable tableting machine. Each tablet contains 50 mg. of active ingredient.

EXAMPLE 6

Preparation of hard shell capsules containing 2-acetylamino-5-nitrothiazole

The active ingredient, 2-acetylamino-5-nitrothiazole may be dispensed in hard shell capsules. A formulation found useful for preparing such capsules is as follows:

| Ingredient | Per capsule, mg. | For 1,000 capsules, g. |
|---|---|---|
| 2-acetylamino-5-nitrothiazole | 50 | 50 |
| Lactose | 90 | 90 |
| Magnesium stearate | 1 | 1 |
| Total | 141 | 141 |

The active ingredient, lactose and magnesium stearate are blended together. The mixture is used to fill hard shell capsules of a suitable size at a fill weight of 141 mg. per capsule.

EXAMPLE 7

Preparation of oral suspension containing 2-propionylamino-5-nitrothiazole

Ingredient: Amount, percent w./v.
2-propionylamino-5-nitrothiazole _____ 1.00
Magnesium aluminum silicate gel _____ 0.50
Sucrose _____ 60.00
Methylparaben _____ 0.08
Propylparaben _____ 0.02
Flavoring agent, q.s.
Distilled water, q.s. ad 100.00.

The parabens and sucrose are dissolved in about two-thirds of the final volume of distilled water at 80° C. and the Veegum is added with stirring. The suspension is cooled to 40° C. The active ingredient and flavoring agent are added with stirring. The cooled suspension is adjusted to final volume with distilled water.

The suspension provides 50 mg. of active ingredient per 5 ml. dose of suspension.

EXAMPLE 8

The active component, 2-acetylamino-5-nitrothiazole, may be incorporated into an injectable suspension according to the following formulation:

| Ingredient: | Amount, percent w./v. |
|---|---|
| 2-acetylamino-5-nitrothiazole (micronized) | 5.0 |
| Polyethylene glycol 4000 U.S.P. | 4.0 |
| Sodium chloride U.S.P. | 0.90 |
| Benzyl alcohol, reagent grade | 0.90 |
| Water for injection, q.s. ad 100.0. | |

The vehicle is prepared by mixing together all of the above ingredients except 2-acetylamino-5-nitrothiazole. The vehicle and micronized active ingredient are rendered sterile by suitable means. A dispersion of the active ingredient in the vehicle is prepared by slurrying the active ingredient first with a portion of the vehicle and then adding the remaining portion of the vehicle while stirring.

A one ml. dose of this suspension provides 50 mg. of active ingredient.

EXAMPLE 9

The anti-testosterone compound 2-acetylamino-5-nitothiazole may be incorporated into a topical jelly according to the following formulation.

| Ingredient: | Amount, percent w./v. |
|---|---|
| 2-acetylamino-5-nitrothiazole | 1.0 |
| Methocel 4000 | 2.75 |
| Parabens (4:1 mixture of methyl and propyl) | 0.1 |
| Propylene glycol | 20.0 |
| Distilled water, q.s. 100.0. | |

The parabens and Methocel are dissolved in about two-thirds of the final volume of distilled water at 80° C. with stirring. The gel is cooled to below 40° C. and is then added with stirring to a solution of the active ingredient in propylene glycol. The final gel is adjusted to volume with distilled water.

A 5 ml. portion of this gel contains 50 mg. of 2-acetylamino-5-nitrothiazole.

EXAMPLE 10

A cream incorporating 2-acetylamino-5-nitrothiazole may be formulated as follows:

| Ingredient: | Amount, percent w./v. |
|---|---|
| 2 - acetylamino - 5-nitrothiazole (finely divided) | 20.0 |
| Liquid petrolatum | 20.0 |
| Cetyl alcohol | 5.0 |
| Parabens (4:1 mixture of methyl and propyl) | 0.1 |
| Emulsifier | 5.0 |
| Glycerin | 5.0 |
| Distilled water, q.s. 100.0. | |

The parabens are dissolved in about two-thirds of the final volume of distilled water at 80° C. with stirring. The solution is cooled to about 50° C. and glycerin is added. Light liquid petrolatum, cetyl alcohol and emulsifier are heated together to about 50° C., blended well, and added with stirring to the warm aqueous solution. The emulsion is cooled to room temperature and the active ingredient is then added with stirring. The volume is adjusted with distilled water.

I claim:
1. A method of decreasing sebum output in pubescent human beings which comprises topically administering to said pubescent human beings an effective sebum reducing amount of a nitrothiazole of the formula:

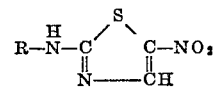

wherein R is loweralkanoyl.

2. A method in accordance with claim 1, in which the sebum reducing effect is produced by topically applying a composition containing as the essential active component 2-acetylamino-5-nitrothiazole.

3. A method in accordance with claim 2, wherein the composition contains at least 25% of 2- acetylamino-5-nitrothiazole.

4. A method of decreasing sebum output in human beings which comprises topically applying to the intact skin of said human beings a composition containing from about 1 mg. to 64 mg. per kilogram of human being of 2-acetylamino-5-nitrothiazole.

5. A topical composition for decreasing the sebum output in pubescent human beings which comprises a pharmaceutical carrier and from 25 mg. to 250 mg. of 2-lower alkanoylamino-5-nitrothiazole.

6. A topical composition in accordance with claim 5, in which the active component is 2 - acetylamino - 5- nitrothiazole.

References Cited

UNITED STATES PATENTS 2,531,756  11/1950  Waletsky et al. _____ 424—263

OTHER REFERENCES

Chem. Abst., 58, 14481(b), 1963.

STANLEY J. FRIEDMAN, Primary Examiner